(12) United States Patent
Wiener et al.

(10) Patent No.: US 8,156,657 B2
(45) Date of Patent: Apr. 17, 2012

(54) MEASURING TOOL

(75) Inventors: Ittai Wiener, Even Yehuda (IL); Alex Feygelman, Petach-Tiqwa (IL); Peter Nedelin, Ashdod (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 68 days.

(21) Appl. No.: 12/731,378

(22) Filed: Mar. 25, 2010

(65) Prior Publication Data
US 2011/0232114 A1    Sep. 29, 2011

(51) Int. Cl.
G01B 1/00        (2006.01)
B43L 7/00        (2006.01)

(52) U.S. Cl. .......................................... 33/494; 33/562

(58) Field of Classification Search .................... 33/494, 33/563, 1 BB, 562
See application file for complete search history.

(56) References Cited

U.S. PATENT DOCUMENTS

| | | | | |
|---|---|---|---|---|
| 1,708,551 A * | 4/1929 | Nell | .............................. | 33/476 |
| 4,244,639 A * | 1/1981 | Kanda | ........................... | 33/200 |
| 4,607,433 A * | 8/1986 | Meeker | ........................ | 33/1 BB |
| 4,641,436 A * | 2/1987 | Tzen et al. | .................... | 33/483 |
| 4,734,993 A * | 4/1988 | Pan | ................................ | 33/483 |
| 5,137,025 A * | 8/1992 | Turner, II | ...................... | 33/1 C |
| 5,511,316 A * | 4/1996 | Fischer et al. | ................. | 33/1 F |
| 5,557,996 A * | 9/1996 | Reber et al. | ..................... | 33/562 |
| 5,666,737 A * | 9/1997 | Ryan, III | ......................... | 33/562 |
| 5,791,062 A * | 8/1998 | Walker | ............................ | 33/563 |
| 5,819,422 A * | 10/1998 | Schafer | .......................... | 33/1 B |
| 6,049,987 A * | 4/2000 | Robell | ............................ | 33/1 B |
| 6,092,297 A * | 7/2000 | Simon | ............................ | 33/733 |
| 6,115,926 A * | 9/2000 | Robell | ............................ | 33/1 B |
| 6,311,408 B1* | 11/2001 | Madayag | ........................ | 33/653 |
| 6,839,971 B2* | 1/2005 | Schafer et al. | .................. | 33/1 B |
| 6,925,724 B2* | 8/2005 | Tandy | ............................. | 33/563 |
| 6,983,544 B2* | 1/2006 | Echizenya | .................... | 33/1 BB |
| 7,032,534 B1* | 4/2006 | Thiemann et al. | .............. | 33/562 |
| 7,100,295 B1* | 9/2006 | Chang | ............................ | 33/379 |
| 7,127,826 B2* | 10/2006 | Russell | .......................... | 33/758 |
| 7,185,441 B2* | 3/2007 | Lockyer | ......................... | 33/562 |
| 7,251,898 B2* | 8/2007 | Schafer et al. | .................. | 33/1 B |
| D601,442 S * | 10/2009 | Haren | ........................... | D10/64 |
| 7,854,073 B1* | 12/2010 | Webb | ............................. | 33/566 |
| 7,918,032 B2* | 4/2011 | Zaremski | ........................ | 33/492 |
| 2005/0034317 A1* | 2/2005 | Burandt et al. | ................ | 33/512 |
| 2005/0257393 A1* | 11/2005 | Spanski et al. | ................. | 33/758 |
| 2010/0223798 A1* | 9/2010 | Zimmerman | ................... | 33/494 |

* cited by examiner

*Primary Examiner* — Yaritza Guadalupe-McCall (57) ABSTRACT

In one embodiment, a measuring tool includes a transparent sheet; a first pattern of markings on the transparent sheet for measuring characteristics of a test sheet; and a second pattern of markings on the transparent sheet for measuring characteristics of a target image printed on the test sheet. In another embodiment, a measuring tool includes a transparent substrate and a reference image on the transparent substrate. The reference image includes an alignment pattern for aligning the reference image, a first scale for measuring distances in a first direction, a second scale for measuring distances in a second direction perpendicular to the first direction, and a skew pattern for measuring perpendicularity.

16 Claims, 9 Drawing Sheets

26a over 78a

FIG. 11

26a over 78a

MEASURING TOOL

BACKGROUND

Image placement, scaling and skew are some of the parameters used to assess the quality of a printed image, for example an image printed with a digital or offset printing press. Each of these parameters may be measured on a printed image and the measurement used to calibrate the press to correct any deviations from the desired image placement, scaling or skew. Currently, these and other calibration parameters are measured with an optical ruler or a simple ruler. The effective use of an optical ruler requires a knowledgeable operator. And, optical rulers are expensive. Simple rulers often do not provide sufficiently accurate and reliable measurements.

DESCRIPTION

The present disclosure is directed to a new measuring tool developed in an effort to make measuring calibration parameters for a digital printing press easier and more accurate, using a tool significantly less expensive than an optical ruler. Accordingly, one example embodiment of the new measuring tool is configured to measure parameters often used to calibrate a digital printing press for desired image quality. Embodiments of the new tool, however, are not limited to measuring calibration parameters or to use with a digital printing press. Thus, the following description should not be construed to limit the scope of the disclosure, which is defined in the claims that follow the description.

As used in this document: a "square" means a pattern of lines or other markings depicting at least one right angle and two straight sides used to measure, test or lay out right angles; a "target image" means a printed image having one or more parts or characteristics that may be measured using an embodiment of the new measuring tool; and a "test sheet" means a printable substrate having one or more parts or characteristics that may be measured using an embodiment of the new measuring tool, including but not necessarily limited to a target image.

Also, as used in this document: reference to the X direction means along the X axis or along a line parallel to the X axis in either direction along the axis/line; reference to the Y direction means along the Y axis or along a line parallel to the Y axis in either direction along the axis/line; and, in general, reference to a first direction means along a first line or along a line parallel to the first line in either direction along the line, and reference to a second direction means along a second line or along a line parallel to the second line in either direction along the line.

Figure 1:
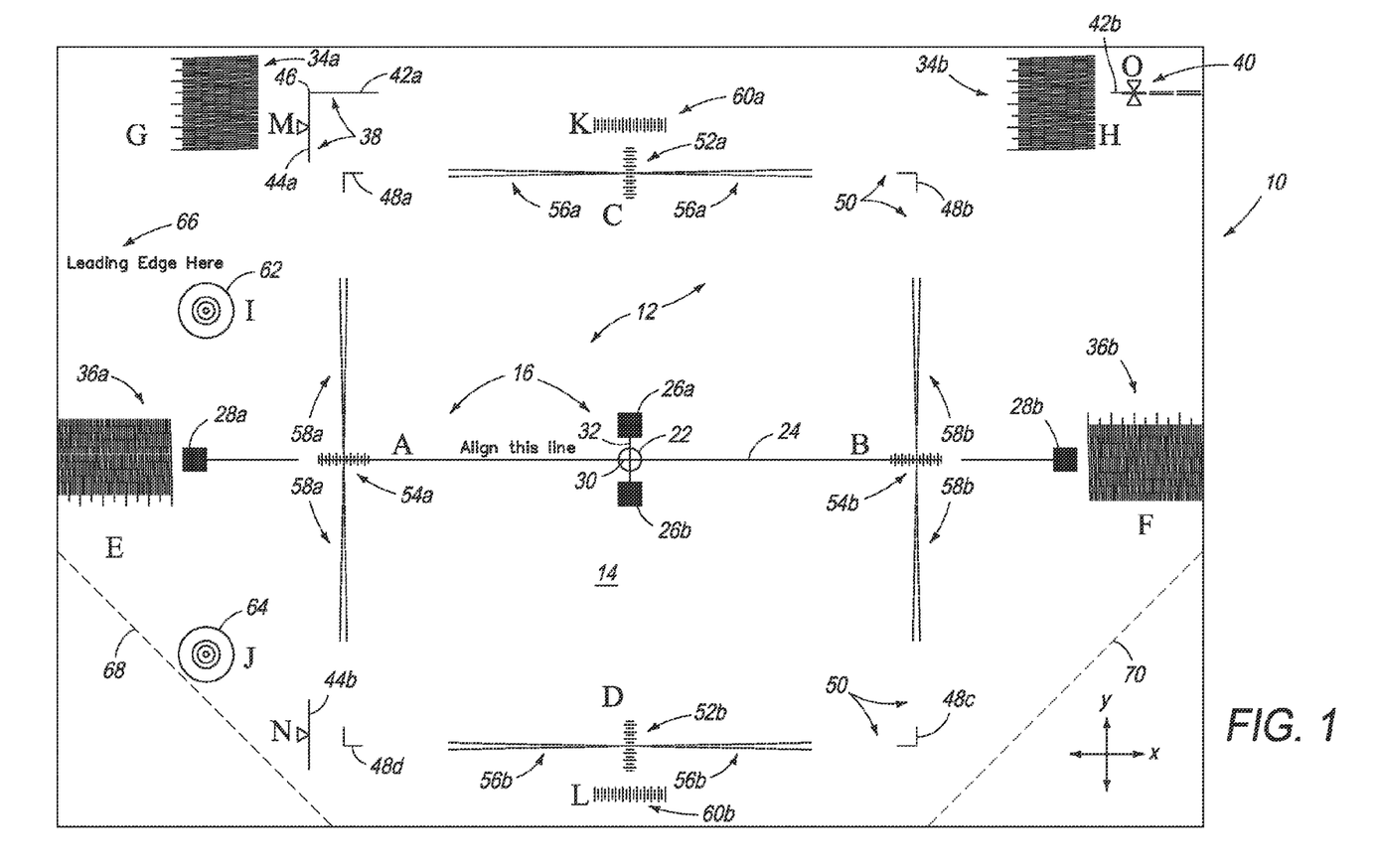
FIG. 1 illustrates a measuring tool according to an embodiment of the disclosure.

FIG. 1 illustrates a measuring tool 10 according to one example embodiment of the disclosure. Referring to FIG. 1, measuring tool 10 includes a reference image 12 on a transparent substrate 14. For example, in one embodiment, reference image 12 is printed on a flexible, transparent sheet 14 using a suitably precise printer. For another example, image 12 is formed on a rigid, transparent plate 14. Where tool 10 is used to measure calibration parameters for a high quality printed image, such as an image produced by a digital printing press, it is desirable to print or otherwise form some parts of reference image 12 (or all of image 12) to a resolution of 50 microns or finer. Accordingly, reference image 12 may be printed on a transparency sheet 14 using, for example, a high precision flexographic printing press.

FIGS. 2-9 are detail views of each of the scales on measuring tool 10. Referring now to FIGS. 1-9, reference image 12 includes an alignment pattern 16 for aligning reference image 12 to a printed target image. One example of a target image is the calibration image 18 printed on a test sheet 20 shown in FIG. 10. As described in more detail below, measuring tool 10 is laid over a test sheet 20, and calibration image 18 aligned with reference image 12, so that various measurements may be taken on calibration image 18 and test sheet 20 using measuring tool 10.

Still referring to FIGS. 1-9, in the embodiment shown, alignment pattern 16 includes a cross 22, a centerline 24, and two pairs of markers 26a, 26b and 28a, 28b. One line 30 of cross 22 extends in an X direction (along line 24) and the other line 32 of cross 22 extends in a Y direction perpendicular to the X direction. (The X-Y axis notation on FIG. 1 is included for clarity in this description. It is not part of reference image 12.) Line 24 extends in the X direction. In the embodiment shown, cross 22 is formed as a crosshair 22 located at the center of reference image 12 and cross lines 30 and 32 define centerlines of image 12 in the X and Y directions, respectively. Accordingly, line 24 defines a centerline of reference image 12 in the X direction.

Markers 26a and 26b are spaced apart from one another on either side of centerline 24 in the Y direction. Markers 28a and 28b are spaced apart from one another along centerline 24 in the X direction. In the embodiment shown, each marker 26a, 26b is formed by a series of Y direction lines with a predetermined spacing and each marker 28a, 28b is formed by a series of X direction lines with a predetermined spacing. Although other suitable configurations for alignment pattern 16 are possible, the configuration shown in FIGS. 1-9 along with corresponding markers in calibration image 18 (FIG. 10) allows the user of measuring tool 10 to easily visually align reference image 12 to test sheet 20 and calibration image 18 (FIG. 10), as described in more detail below.

Figure 2:
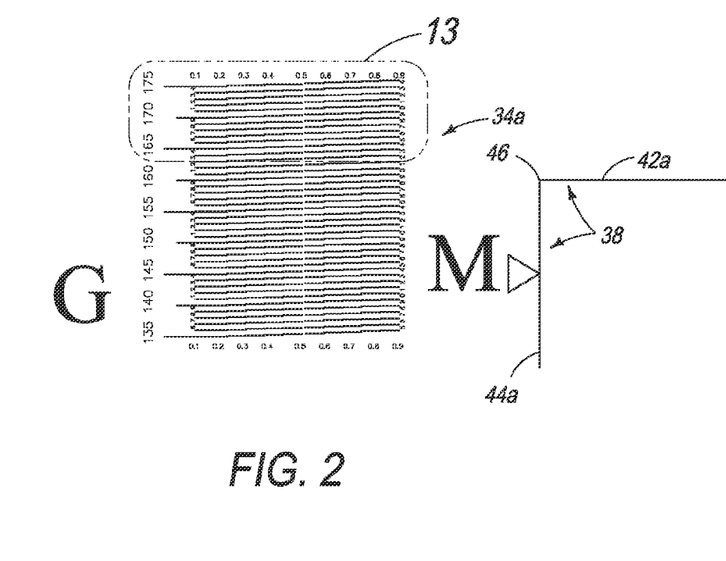
FIGS. 2-9 are detail views of each scale on the measuring tool illustrated in FIG. 1.
Figure 3:
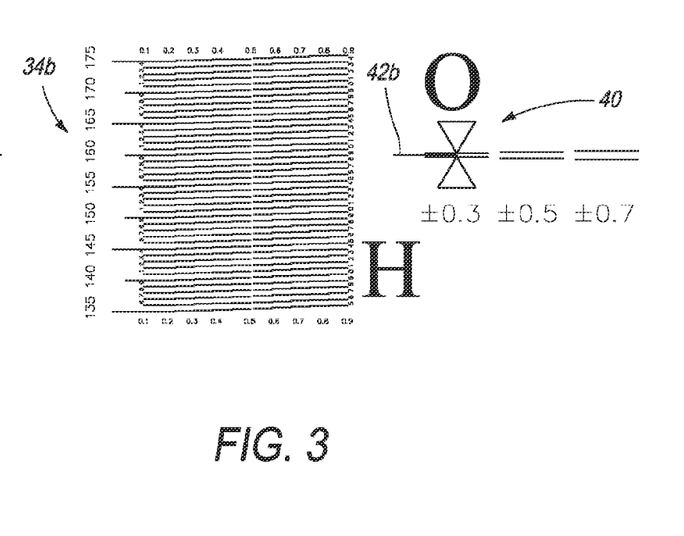
Figure 4:
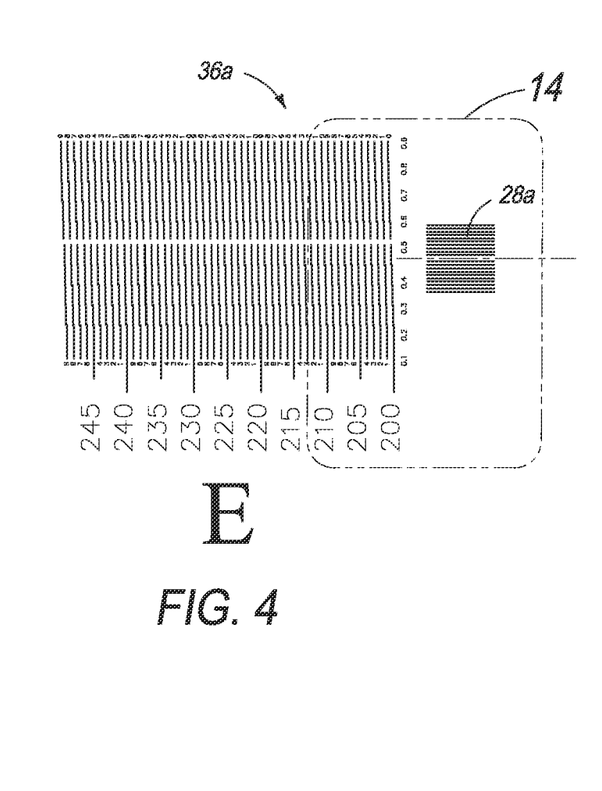
Figure 5:
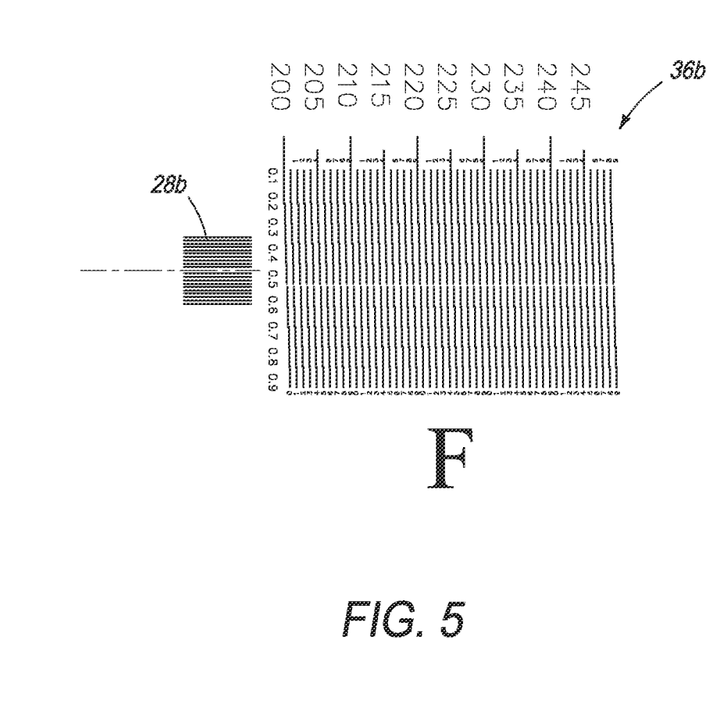
Figure 6:
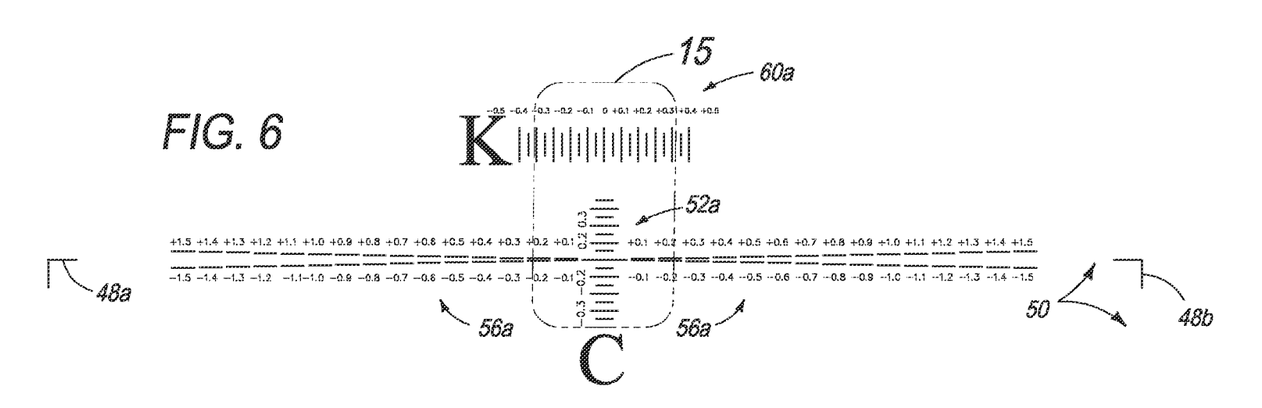
Figure 7:
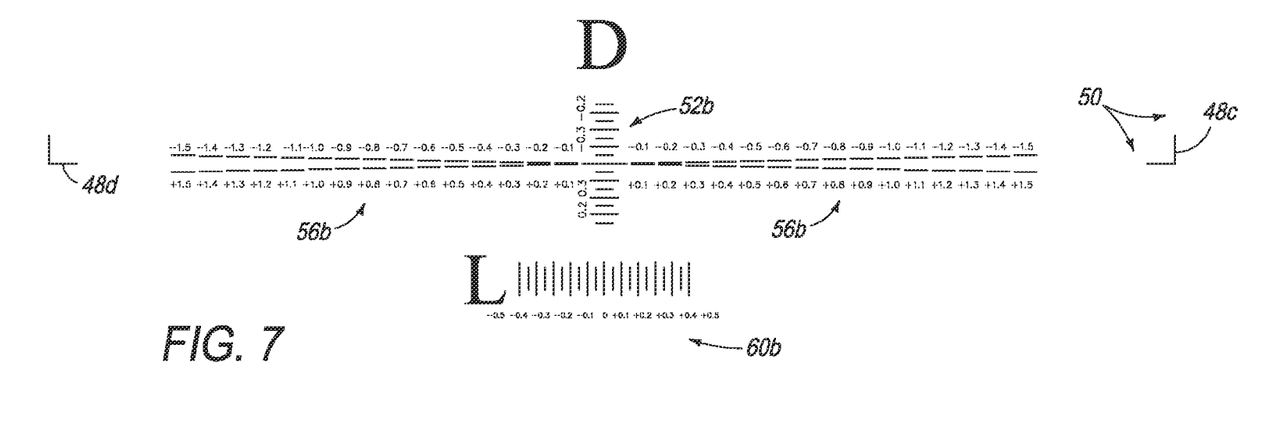
Figure 8:
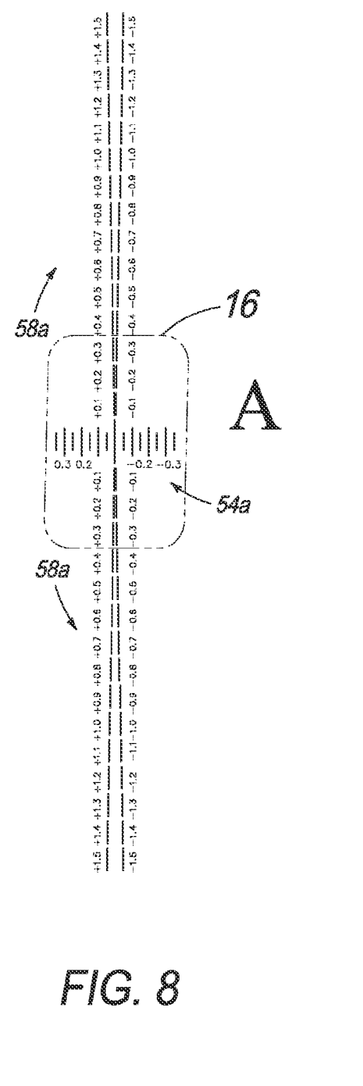
Figure 9:
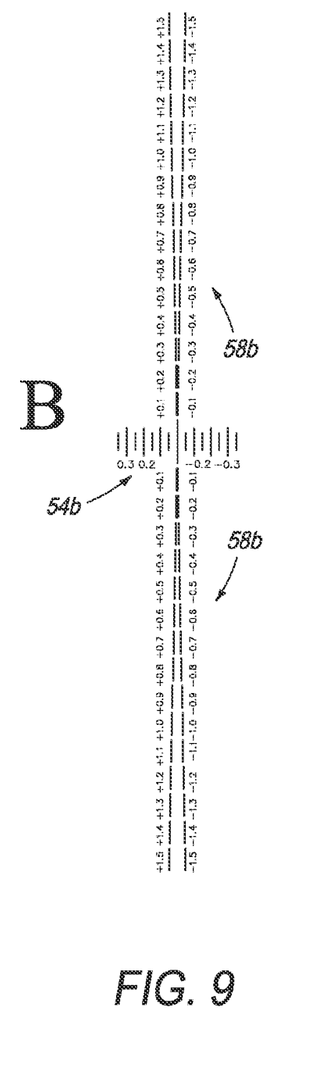
Figure 10:
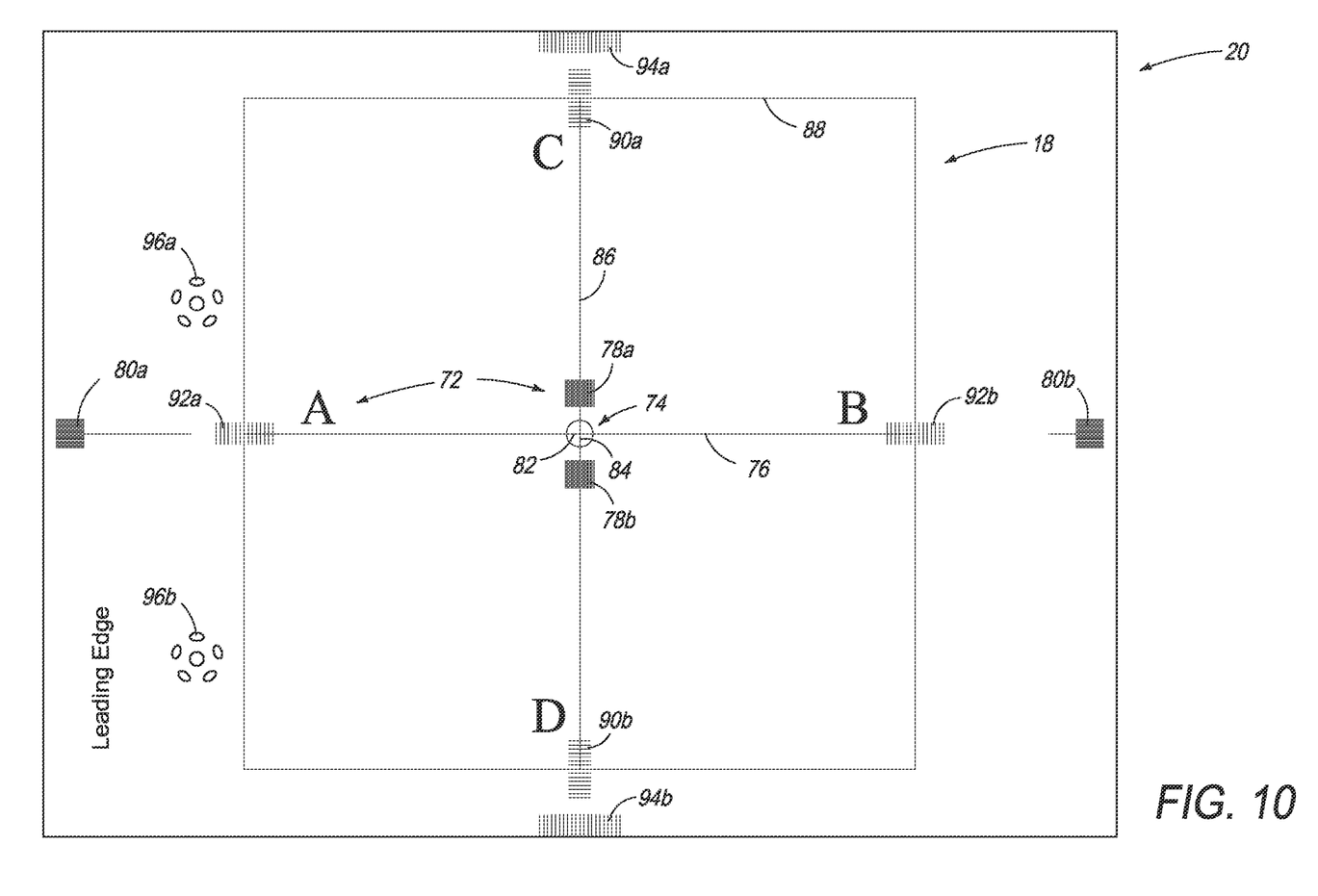
FIG. 10 illustrates one embodiment of a test sheet with a printed calibration image exhibiting certain calibration parameters that may be measured using the tool illustrated in FIG. 1.
Figure 13:
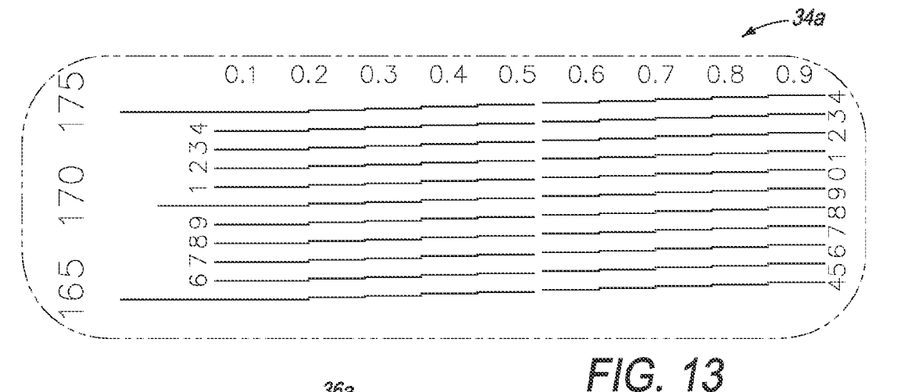
FIGS. 13-16 are enlargements of a portion of each of scales 34a, 36a, 52a/56a/60a, and 54a/58a in FIGS. 2, 4, 6, and 8, respectively.
Figure 14:
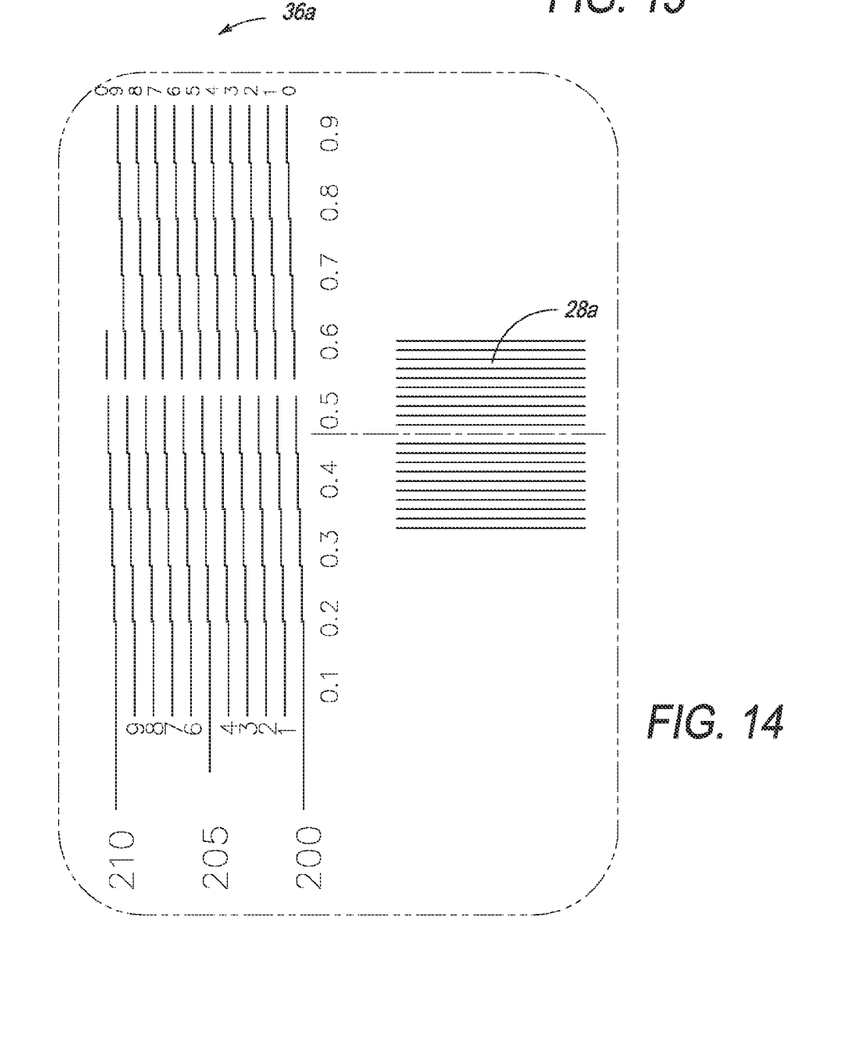

Reference image 12 also includes first scales 34a and 34b for measuring distances from centerline 24 in the Y direction and second scales 36a and 36b for measuring distances in the X direction from centerline 32. Where, as here, tool 10 is used to measure quality parameters for a printed image, such as image placement, scaling, and skew, reference image 12 should be at least as large as the test sheet. Each first scale 34a, 34b and each second scale 36a, 36b is placed at an outer perimeter of reference image 12 for measuring distances to one of the edges of a test sheet 20 (FIG. 10). In the embodiment shown, as best seen in FIGS. 2 and 3, scales 34a, 34b measure distances in the range of 135 mm to 175 mm from centerline 24 and, as best seen in FIGS. 4 and 5, scales 36a, 36b measure distances in the range of 200 mm to 250 mm from the center of reference image 12 along line 24. Thus, this particular embodiment of tool 10 may be used for printable sheets 270 mm to 350 mm wide and 400 mm to 500 mm long. As best seen in the enlargements of FIGS. 13 and 14, distances along each scale 34a, 34b and 36a, 36b are set off in increments of 1.0 mm along a primary scale and further resolved in increments of 0.1 mm along a secondary scale.

Reference image 12 also includes a square 38 for measuring perpendicularity and an out-of-square scale 40 for measuring the magnitude of any deviation in perpendicularity with respect to square 38. In the embodiment shown, each side of square 38 is defined by two line segments 42a, 42b and 44a, 44b. One side 42a, 42b extends in the X direction and the other side 44a, 44b extends in the Y direction. Line segments 42a and 44b intersect at a corner 46. Scale 40 is located at line segment 42b along the X side of square 38. In one example embodiment, square 38 is located near the perimeter of reference image 12, as shown in FIG. 1, for convenience measuring the cutting accuracy of the test sheet 20 (FIG. 10) as reflected in any deviation (or lack thereof) in the perpendicularity of the adjacent sides of the sheet.

Figure 15:
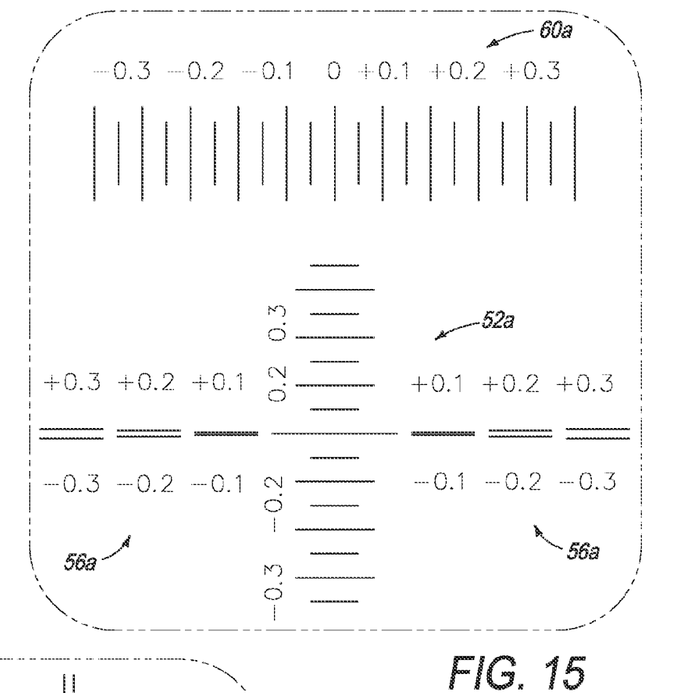
Figure 16:
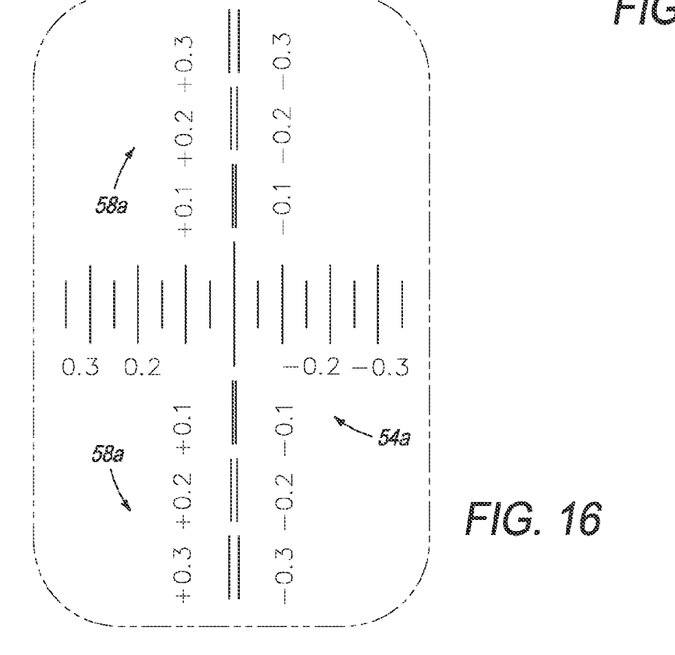

With continued reference to FIGS. 1-9, reference image 12 also includes corner marks 48a, 48b, 48c and 48d that define a rectangle, indicated generally by part number 50. Two sets of scales are positioned along each side of rectangle 50 measure deviations from rectangle 50 on a corresponding rectangle on a calibration image 18 (FIG. 10). One set of scales provides a finer measurement and the other set provides a more coarse measurement. Third scales 52a, 52b and fourth scales 54a, 54b are positioned along each side of rectangle 50 for measuring deviations from rectangle 50 on a corresponding rectangle on a calibration image 18 (FIG. 10). In the embodiment shown, distances along each scale 52a, 52b and 54a, 54b are measured in increments of 0.05 mm (50 microns) up to ±0.35 mm. Fifth scales 56a, 56b and sixth scales 58a, 58b are positioned along each side of rectangle 50 for measuring deviations from rectangle 50 on a corresponding rectangle on a calibration image 18 (FIG. 10). In the embodiment shown, and referring also to the enlargements of FIGS. 15 and 16, distances along each scale 56a, 56b and 58a, 58b are set off in increments of 0.1 mm up to ±1.5 mm.

Seventh scales 60a and 60b are positioned opposite one another on either side of X axis centerline 24 in the Y direction for measuring perpendicularity in the XY plane. In the embodiment shown, seventh scales 60a and 60b are positioned along, and span, the Y direction centerline 32 and, referring also to the enlargement of FIG. 15, distances are measured in increments of 0.05 mm up to ±0.5 mm.

Referring now to FIG. 1, reference image 12 also includes a first pattern of concentric circles 62 and a second pattern of concentric circles 64 located near a leading edge 66 of image 12. Circle patterns 62 and 64 are spaced apart from one another on either side of X direction centerline 24 for measuring a suction cup margin on test sheet 20 (FIG. 10). In some digital printing presses, printed sheets are removed from the impression cylinder (where images are printed on to the sheets) and moved downstream for further processing using rotating fingers. A suction cup on the end of each finger grabs and holds the sheet. The suction cups should grab the sheet at the desired location to help accurately move the sheet. As described below, circle patterns 62 and 64 are used in conjunction with scales 34a and 36a to measure the location of the suction cups on test sheet 20 relative to the leading edge of sheet 20 (FIG. 10). This distance is referred to as suction cup margin.

Referring to FIG. 1, in the embodiment shown, the lower left and right corners of substrate 14 are cut-off along diagonals 68 and 70, respectively. The resulting beveled corners allow the user to easily hold and move measuring tool 10 over a test sheet 20 to properly align tool 10 to sheet 20 (FIG. 10).

FIG. 10 illustrates one embodiment of a test sheet 20 with a printed calibration image 18 such as might be used with measuring tool 10 to evaluate the quality of an image printed with a digital printing press. Various measurements may then be used, if necessary or desirable, to calibrate the press to correct any deviations from the desired print quality. Calibration image 18 may be printed in a different color from that of reference image 12 on measuring tool 10 (FIG. 1) to make the test sheet markings easier to see on the measuring tool scales. For example, reference image 12 may be printed in black and calibration image 18 printed in cyan.

Referring to FIG. 10, calibration image 18 includes an alignment pattern 72 for aligning calibration image 18 to reference image 12 (FIG. 1). Alignment pattern 72 includes a cross 74, an X direction centerline 76, and two pairs of markers 78a, 78b and 80a, 80b corresponding to markers 26a, 26b and 28a, 28b, respectively, on reference image 12 (FIG. 1). One line 82 of cross 74 extends along X direction centerline 76 and the other line 84 of cross 74 extends along a Y direction centerline 86. (The X-Y axis notation on FIG. 10 is included for clarity in this description. It is not part of calibration image 18.)

Markers 78a and 78b are spaced apart from one another on either side of an X direction centerline 76 along Y direction centerline 86. Markers 80a and 80b are spaced apart from one another along X direction centerline 76. Each marker 78a, 78b is formed by a series of Y direction lines with a predetermined spacing different from the line spacing of markers 26a, 26b in reference image 12 (FIG. 1). Each marker 80a, 80b is formed by a series of X direction lines with a predetermined spacing different from the spacing of the lines in markers 28a, 28b in reference image 12 (FIG. 1). When reference image markers 26a, 26b and 28a, 28b are placed over calibration image markers 78a, 78b and 80a, 80b, respectively, the lines of each pair of markers form an interference pattern, sometimes called a moiré pattern, that helps the user easily align tool 10 (FIG. 1) with calibration image 18.

Still referring to FIG. 10, calibration image 18 also includes a rectangle 88 that corresponds to rectangle 50 in reference image 12 (FIG. 1). Nonius bars 90a and 90b span the perimeter of rectangle 88 along Y direction centerline 86. Nonius bars 92a and 92b span the perimeter of rectangle 88 along X direction centerline 76. The location of nonius bars 90a, 90b and 92a, 92b corresponds to the location of third scales 52a, 52b and fourth scales 54a, 54b in reference image 12 (FIG. 1), respectively, for measuring deviations in rectangle 88 from reference image rectangle 50 (FIG. 1). Calibration image 18 also includes nonius bars 94a and 94b that span Y direction centerline 86 outside rectangle 88. The location of nonius bars 94a and 94b corresponds to the location of seventh scales 60a and 60b in reference image 12 (FIG. 1) for measuring the perpendicularity of centerlines 76 and 86.

One example use of tool 10 with test sheet 20 will now be described with reference to FIGS. 1-12. Increments of distance of 0.1 mm or smaller on each of the scales are readable without enhancement by a human having normal vision. Referring first to FIGS. 1-9, fields A and B (scales 54a, 54b and 58a, 58b) are used to measure vertical (Y direction) scaling and fields C and D (scales 52a, 52b and 56a, 56b) are used to measure horizontal (X direction) scaling. Fields E and G (scales 36a and 34a) are used to measure image placement. Fields E and F (scales 36a and 36b) are used to measure sheet length. Fields G and H (scales 34a and 34b) are used to measure sheet feed skew and fields I, J and G (circles 62, 64 and scale 34a) are used to measure sheet feed centering. Fields I, J and E (circles 62, 64 and scale 36a) are used to measure suction cup margin. Fields K and L (scales 60a and 60b) are used to measure writing head skew.

Figure 11:
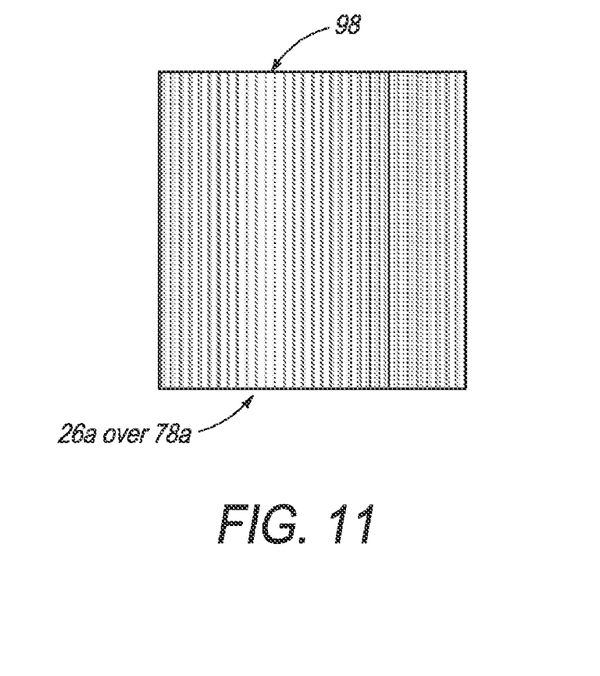
FIGS. 11 and 12 are detail views illustrating the effect of overlaying one of the measuring tool alignment markers on to the corresponding test sheet alignment marker to help the user align the measuring tool to the test sheet.
Figure 12:
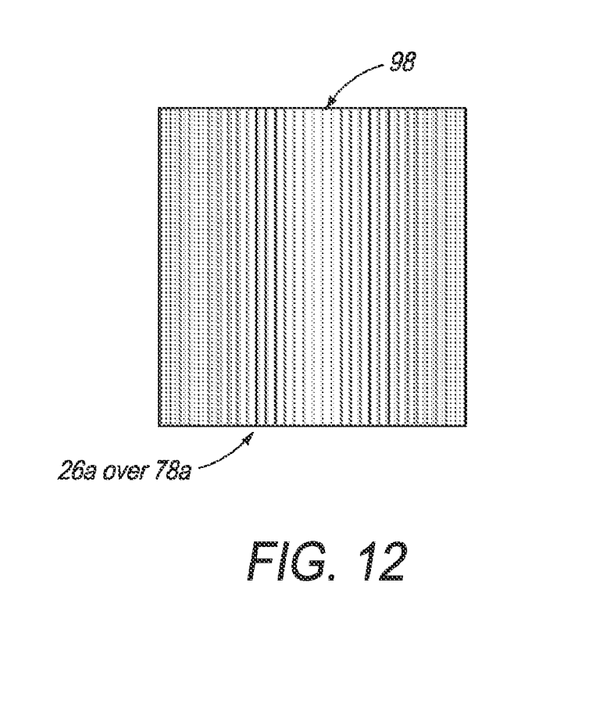

Referring now to FIGS. 1 and 10, tool 10 is laid over test sheet 20. Test sheet 20 is aligned to tool 10 by aligning letters A and B along centerlines 24 and 76 and by aligning reference image markers 26a, 26b and 28a, 28b to calibration image markers 78a, 78b and 80a, 80b. When reference image markers 26a, 26b and 28a, 28b are placed over calibration image markers 78a, 78b and 80a, 80b, respectively, the lines of each pair of markers form an interference pattern that is visible as a color gradient that helps the user easily align reference image 12 with calibration image 18. This effect is illustrated in FIGS. 11 and 12 for markers 26a and 78a for example. In FIG. 11, the lighter part 98 of the color gradient is off-center, indicating improper alignment between the markers. In FIG. 12, the lighter part 98 of the color gradient is centered, indicating the markers are properly aligned.

Once reference image 12 and calibration image 18 are aligned, scaling measurements may be taken along X direction line 76 using scales 54a, 54b and 58a, 58b (fields A and B) and along Y direction line 86 using scales 52a, 52b and 56a, 56b (fields C and D). Distances along scales 52a, 52b and 54a, 54b are read with nonius bars 90a, 90b and 92a, 92b on calibration image 18 (where the lines match) in increments of 0.05 mm (50 microns) up to ±0.35 mm. Distances along scales 56a, 56b and 58a, 58b are read with the sides of rectangle 88 on calibration image 18 (where the lines match) in increments of 0.1 mm up to ±1.5 mm.

The length of test sheet 20 is measured using scales 36a, 36b (fields E and F) by measuring from the center of sheet 20 to the leading edge and to the trailing edge. Distances along each scale 36a and 36b are set off in increments of 1.0 mm along a primary scale and further resolved in increments of 0.1 mm along a secondary scale. Measurements along the secondary scale are read where the edge of the sheet intersects a scale line (the scale lines are not parallel to Y axis).

Any skew of sheet 20 in the print zone may be measured using scales 34a and 34b (fields G and H) by comparing the distance from line 24 to the edge of sheet 20 at each scale 34a and 34b. Distances along each scale 34a and 34b are set off in increments of 1.0 mm along a primary scale and further resolved in increments of 0.1 mm along a secondary scale. Measurements along the secondary scale are read where the edge of the sheet intersects a scale line (the scale lines are not parallel to the X axis).

Any skew in calibration image 18 caused by misalignment of the print head to the media path will be evident in a deviation in perpendicularity of Y direction line 86 with respect to X direction line 76 on calibration image 18. Any such deviation in perpendicularity may be measured using scales 60a and 60b (fields K and L). Distances along scales 60a and 60b are read with nonius bars 94a, 94b on calibration image 18 (where the lines match) in increments of 0.05 mm (50 microns) up to ±0.5 mm.

Image placement on sheet 20 may be measured using scales 36a and 36b (fields E and F) and scales 34a and 34b (fields G and H). Measuring the distances from the center of calibration image 18 to the edges of test sheet 20 indicates the placement of image 18 on sheet 20.

An deviation in the perpendicularity of the edges of sheet 20 may be measured using square 38 and scale 40 (fields N, M and O). A corner of sheet 20 is placed in the corner 46 of square 38 and one edge aligned with line segments 44a and 44b. Any deviation in perpendicularity of the adjacent edges of sheet 20 will be evident along line segments 42a and 42b, and measured at scale 40 in increments of 0.1 mm up to ±0.7 mm.

Suction cup margin may be measured using circle patterns 62, 64 and scale 36a (fields I, J and E). The location of the suction cups is marked on test sheet 20 by, for example, coating the suction cups with ink and running a sheet through the press. Suction cup marks 96a and 96b may be placed on test sheet 20 along with a calibration image 18, or suction cup marks 96a and 96b may be placed on a test sheet without a calibration image. Circles patterns 62 and 64 on tool 10 are aligned with suction cup marks 96a and 96b and the "margin" to leading edge 66 measured on scale 36a in increments of 0.05 mm.

The centering of sheet 20 in the printer media path may be measured using circle patterns 62, 64 and scale 34a (fields I and J with G). Circle patterns 62 and 64 on tool 10 are aligned with suction cup marks 96a and 96b on test sheet 20 and the distance to the edge of sheet 20 measured on scale 34a. This measured distance, which indicates half the sheet width, may be compared to the actual sheet width to determine whether or not sheet 20 is centered in the media path.

As noted at the beginning of this Description, the exemplary embodiments shown in the figures and described above illustrate but do not limit the disclosure. Other forms, details, and embodiments may be made and implemented. Therefore, the foregoing description should not be construed to limit the scope of the disclosure, which is defined in the following claims.

What is claimed is:

1. A measuring tool, comprising:
    a transparent sheet;
    a first pattern of markings on the transparent sheet for measuring characteristics of a test sheet, the first pattern of markings including:
        a first scale for measuring distances in a first direction to one edge of the test sheet;
        a second scale for measuring distances in a second direction perpendicular to the first direction to another edge of the test sheet;
        a square for measuring perpendicularity of two intersecting edges of the test sheet; and
        a third scale for measuring the magnitude of a deviation in perpendicularity of the intersecting edges of the test sheet with respect to the square; and
    a second pattern of markings on the transparent sheet for measuring characteristics of a target image printed on the test sheet, the second pattern of markings including:
        a fourth scale for measuring a distance in a first direction to one side of the target image; and
        a fifth scale for measuring a distance in a second direction perpendicular to the first direction to another side of the target image.

2. The tool of claim 1, further comprising an alignment pattern on the transparent sheet for aligning the transparent sheet to the test sheet.

3. The tool of claim 1, wherein the second pattern of markings further comprises a sixth scale for measuring a deviation in a perpendicularity of the target image.

4. The tool of claim 1, wherein increments of distance of 0.1 mm or smaller on each of the first and second scales are readable without enhancement by a human having normal vision.

5. A measuring tool, comprising:
    a transparent substrate; and
    a reference image on the transparent substrate, the reference image including:

an alignment pattern for aligning the reference image, the alignment pattern including: a cross marking a center of the reference image at an intersection of a first line extending in the first direction and a second line extending in the second direction; and a pair of markers spaced apart from one another on either side of one of the lines;

a first scale for measuring distances in a first direction, the first scale having increments of distance 0.1 mm or smaller that are readable without enhancement by a human having normal vision;

a second scale for measuring distances in a second direction perpendicular to the first direction, the second scale having increments of distance 0.1 mm or smaller that are readable without enhancement by a human having normal vision;

a skew pattern for measuring perpendicularity.

6. The tool of claim 5, wherein the pair of markers comprises:

a first pair of markers spaced apart from one another on either side of the first line; and a second pair of markers spaced apart from one another on either side of the second line.

7. The tool of claim 5, wherein:

the first scale is located at an outer perimeter of the reference image for measuring a distance in the first direction from a center of the reference image to one edge of a test sheet; and the second scale is located at an outer perimeter of the reference image for measuring a distance in the second direction from a center of the reference image to another edge of the test sheet.

8. The tool of claim 7, wherein:

the first scale comprises a pair of first scales located opposite one another at an outer perimeter of the reference image for measuring distances in the first direction from a center of the reference image to opposite edges of the test sheet; and the second scale comprises a pair of second scales spaced apart from one another in the first direction along an outer perimeter of the reference image for measuring distances in the second direction to the same edge of the test sheet.

9. The tool of claim 5, wherein the skew pattern comprises:

a square for measuring perpendicularity; and a third scale for measuring the magnitude of a deviation in perpendicularity with respect to the square.

10. The tool of claim 5, wherein the skew pattern comprises a pair of third scales positioned opposite one another on either side of a first line for measuring perpendicularity in a plane defined by the first line and a second line perpendicular to the first line.

11. The tool of claim 5, wherein:

the first scale is located within the reference image for measuring a distance in the first direction from a center of the reference image to one side of a rectangle printed on a test sheet; and the second scale is located within the reference image for measuring a distance in the second direction from the center of the reference image to another side of the rectangle printed on the test sheet.

12. The tool of claim 5, wherein the reference image further comprises:

first concentric circles located near a leading edge of the reference image; and second concentric circles located near the leading edge of the reference image spaced apart from the first concentric circles in the second direction.

13. A measuring tool kit, comprising:

a measuring tool;

a test sheet having a target image printed thereon; and the measuring tool comprising a flexible, transparent sheet having a first pattern of markings thereon for measuring characteristics of the test sheet and a second pattern of markings thereon for measuring characteristics of the target image printed on the test sheet.

14. The kit of claim 13, wherein:

the measuring tool includes a pair of alignment markers for aligning the measuring tool to the test sheet, the measuring tool markers spaced apart from one another in a first direction and each measuring tool marker characterized by a series of parallel lines having a first spacing; and the test sheet includes a pair of alignment markers corresponding to the measuring tool alignment markers, the test sheet markers spaced apart from one another in the first direction, and each of the test sheet markers characterized by a series of parallel lines having a second spacing different from the first spacing such that when the measuring tool and test sheet markers are laid one over the other a visible pattern is formed indicating the relative alignment of the overlaid markers.

15. The kit of claim 13, wherein the first pattern of markings comprises:

a first scale for measuring distances in a first direction to one edge of the test sheet;

a second scale for measuring distances in a second direction perpendicular to the first direction to another edge of the test sheet;

a square for measuring perpendicularity of two intersecting edges of the test sheet; and a third scale for measuring the magnitude of a deviation in perpendicularity of the intersecting edges of the test sheet with respect to the square.

16. The kit of claim 15, wherein:

the target image includes lines indicating a rectangle; and the second pattern of markings includes a first scale for measuring a distance in a first direction to one side of the target image rectangle and a second scale for measuring a distance in a second direction perpendicular to the first direction to another side of the target image rectangle.

* * * * *